United States Patent
Baba et al.

(10) Patent No.: US 7,498,758 B2
(45) Date of Patent: Mar. 3, 2009

(54) LOWER HALF BODY MODULE OF BIPEDAL WALKING ROBOT

(75) Inventors: Katsuyuki Baba, Kitakyushu (JP); Shigeaki Ino, Kitakyushu (JP); Yoichi Takamoto, Kitakyushu (JP); Atsuo Takanishi, 2-19-9-216, Matsugaoka, Nakano-ku, Tokyo 165-0024 (JP)

(73) Assignees: TMSUK Co., Ltd., Fukuoka (JP); Atsuo Takanishi, Tokyo (JP)

( * ) Notice: Subject to any disclaimer, the term of this patent is extended or adjusted under 35 U.S.C. 154(b) by 429 days.

(21) Appl. No.: 10/567,086

(22) PCT Filed: Sep. 12, 2003

(86) PCT No.: PCT/JP03/11696

§ 371 (c)(1),
(2), (4) Date: Feb. 3, 2006

(87) PCT Pub. No.: WO2005/025814

PCT Pub. Date: Mar. 24, 2005

(65) Prior Publication Data

US 2008/0150465 A1    Jun. 26, 2008

(51) Int. Cl.
*B25J 5/00* (2006.01)
(52) U.S. Cl. .............................. 318/568.12; 318/568.11; 901/22; 901/23; 901/29; 700/245; 700/258
(58) Field of Classification Search ............ 318/568.12, 318/567, 568.11; 74/490.06; 623/24; 414/729; 901/22, 23, 29; 700/245, 258
See application file for complete search history.

(56) References Cited

U.S. PATENT DOCUMENTS 5,114,300 A * 5/1992 Shahinpoor et al. ......... 414/729

(Continued)

FOREIGN PATENT DOCUMENTS

EP    1 340 478 A2    9/2003

(Continued)

OTHER PUBLICATIONS

Mitsuharu Morisawa, et al., "Kankyo Mode o Koryo shita Parallel Link-gata Nisoku Hoko Robot No Anteika Seigyo", The Institute of Electrical Engineers of Japan Sangyo Keisoku Seigyo Ken Kyukai Shiryo, Feb. 17, 2003, vol. II. 03, No. 15, pp. 141-146.

(Continued)

*Primary Examiner*—Paul Ip
(74) *Attorney, Agent, or Firm*—Sughrue Mion, PLLC (57) ABSTRACT

It is an object of the present invention to provide a lower half body module of a bipedal walking robot which is excellent in practicality in the point that it is possible to transport a heavy load, and which is excellent in the degree of freedom in designing in the point that it is possible to mount or incorporate an upper half body having a large weight. Therefore, this is why legs of the lower half body module are constituted by a parallel link mechanism to sustain a large load. The lower half body module (1) of the present invention includes a base (2), a right foot (3) and a left foot (4), a plurality of passive joints (6, 7, 8) which are respectively provided on the base (2), the right foot (3) and the left foot (4), and parallel link mechanism portions (1a, 1b) which are respectively provided between the passive joint (6) provided on the base (2) and the passive joints (7, 8) provided on the right foot (3) and between the passive joint (6) provided on the base (2) and the passive joints (7, 8) provided on the left foot (4).

6 Claims, 7 Drawing Sheets

U.S. PATENT DOCUMENTS

| | | | | |
|---|---|---|---|---|
| 5,740,699 | A | * | 4/1998 | Ballantyne et al. ..... 743/490.06 |
| 6,330,837 | B1 | * | 12/2001 | Charles et al. ........... 74/490.06 |
| 6,581,437 | B2 | * | 6/2003 | Chrystall et al. .................. 73/7 |
| 7,118,601 | B2 | * | 10/2006 | Yasui et al. ................... 623/24 |

FOREIGN PATENT DOCUMENTS

| | | |
|---|---|---|
| JP | 04-250988 | 9/1992 |
| JP | 5-237775 A | 9/1993 |
| JP | 06-087475 | 3/1994 |
| JP | 11-300560 A | 11/1999 |
| JP | 2000-246675 A | 9/2000 |
| JP | 2000-288965 A | 10/2000 |
| JP | 2001-121460 A | 5/2001 |
| JP | 2001-254798 A | 9/2001 |
| JP | 2003-291080 A | 10/2003 |

OTHER PUBLICATIONS

Sugahara et al., Design of a Battery-Powered Multi-Purpose Bipedal Locomotor with Parallel Mechanism, pp. 2658-2663, Proceedings of the 2002 IEEE/RSJ International Conference on Intelligent Robots & Systems, Lausanne, Switzerland Sep. 30-Oct. 4, 2002.

English translation of Office Action issued Feb. 14, 2007 in corresponding Japanese Patent Application No. 2002-133343.

* cited by examiner

LOWER HALF BODY MODULE OF BIPEDAL WALKING ROBOT

TECHNICAL FIELD

The present invention relates to a lower half body module of a bipedal walking robot capable of performing walking operation by a lower half body only, more particularly, it relates to a lower half body module of a bipedal walking robot employing parallel link mechanisms as a leg mechanism.

BACKGROUND ART

Recently, research and development regarding a human type robot which acts in a human's living environment, a so-called humanoid robot, have been widely carried out. The humanoid robot is often used for the purpose of making human life such as not only industrial production but also housework, nursing care for the elderly, etc., comfortable, and must work bearing closely near many and unspecified users in environments made for humans. Therefore, it is requested for the humanoid robot to have the form and performance adapted to the works. Further, the humanoid robot is requested to provide a safe and flexible interface without specific use training, and there are an extremely large number of research subjects. In particular, bipedal walking robots, which have two legs similar to a human as moving means and perform bipedal walking, have been diligently researched and developed in many research institutes and enterprises.

A serial link mechanism with low kinematic constraint has been employed as a leg mechanism common to conventional bipedal walking robots. The serial link mechanism is a mechanism which serially connects a plurality of links, and has been widely used for an industrial manipulator, etc.

As a bipedal walking robot whose legs are constituted by such a serial link mechanism, "a bipedal walking robot comprising: a base body; one or more link mechanism(s) having one or more joint(s) which is/are connected to the base body and connects two links; driving means for driving the joint(s) of the link mechanism(s); and a control unit which controls operation of the driving means" is disclosed in Japanese Published Unexamined Patent Application No. 5-237775 (referred to as Patent reference 1 hereinafter).

Figure 7:
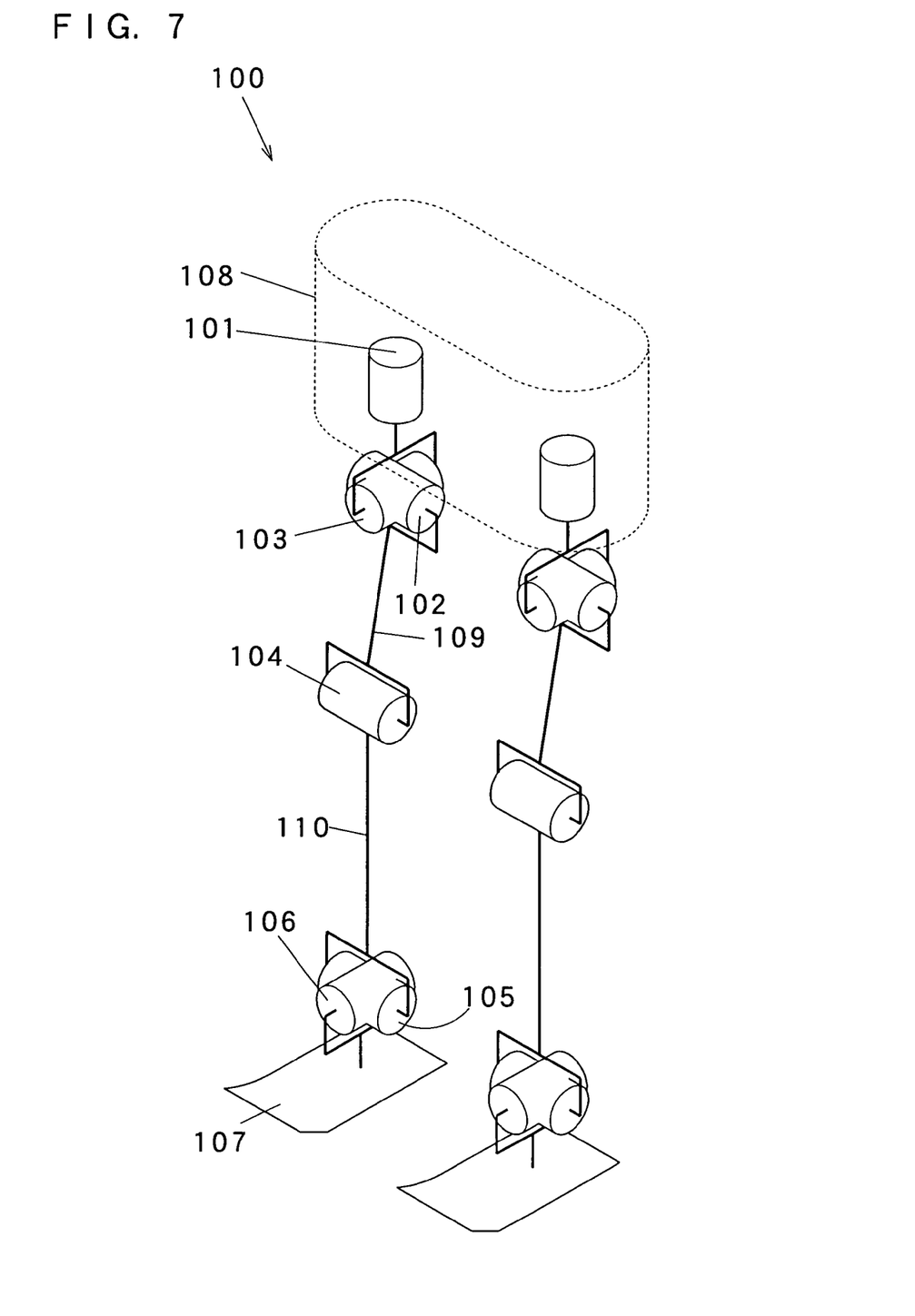
FIG. 7 is a schematic view showing a conventional bipedal walking robot.

FIG. 7 is a schematic view of the conventional bipedal walking robot. Moreover, in FIG. 7, an explanation regarding only a right leg will be provided and an explanation of a left leg will be omitted, as the constitution of the left leg is similar to the constitution of the right leg.

In FIG. 7, reference numeral 100 denotes a conventional bipedal walking robot, 101 denotes a joint for a rotational movement of a crotch, 102 denotes a joint for a longitudinal movement of the crotch, 103 denotes a joint for a lateral movement of the crotch, 104 denotes a joint for a longitudinal movement of a knee, 105 denotes a joint for a longitudinal movement of an ankle, 106 denotes a joint for a lateral movement of the ankle, 107 denotes a foot, 108 denotes a base body, 109 denotes a thigh link connecting the joints of the crotch 101, 102 and 103 with the joint of the knee 104, and 110 denotes a lower thigh link connecting the joint of knee 104 with the joints of the ankle 105 and 106.

As shown in FIG. 7, the conventional bipedal walking robot 100 includes the respective six joints in the right leg and left leg. The crotch and ankle are respectively provided with the joint for longitudinal movement and the joint for lateral movement so that the two joints squarely intersect, axis lines of the joints intersect at one point of space. It is constituted in such a way that rotating axes of the joint for longitudinal movement of the crotch 102, the joint for longitudinal movement of the knee 104 and the joint for longitudinal movement of the ankle 105 are arranged in parallel with each other, the relative positional relationship between the three joints 102, 104 and 105 is not changed regardless of the other three degrees of freedom of movement. Further, the joint for rotational movement 101 is provided in the crotch as a third degree of freedom which makes the whole leg rotate, a rotating axis of the joint 101 is provided so as to be made orthogonal to each axis of the joints 102 and 103 at an intersection of the joints 102 and 103.

Further, "a parallel link for robot driving mechanism which relatively drives a first member and a second member with space of six degrees of freedom, wherein: the parallel link mechanism is constituted by three or more unit links which respectively connect the first member with the second member and have a driving function with two degrees of freedom; and each unit link includes a first arm and a second arm, a rotating driving joint with one degree of freedom which connects the first member with the first arm, a rotating driving with one degree of freedom rotating follower joint with one degree of freedom which connects the first arm with the second arm and a rotating follower joint with three degrees of freedom which connects the second arm with the second member" is disclosed in Japanese Published Unexamined Patent Application No. 2001-121460 (referred to as Patent reference 2 hereinafter).

However, in the above-described conventional arts, there remain problems as follows.

(1) The bipedal walking robot disclosed in the Patent reference 1 cannot structurally sustain a large load, because the legs thereof are constituted by the serial link mechanisms and therefore output power of feet provided on the tip of the legs is small. For example, a heavy load as an upper half body cannot be mounted or incorporated, and therefore the degree of freedom in designing is deficient, or when arms, etc., are provided on the upper half body, it is impossible to move with a heavy load in arms at high speed, and therefore a problem resides in the fact that practicality is lacking.

(2) Further, the conventional bipedal walking robot is designed so as to cooperatively operate by combining the upper half body with the lower half body, because the legs of the lower half body thereof structurally lack stability owing to the constitution by the serial link mechanisms. Thus, since it is difficult to design only a lower half body, it is requested that the lower half body is designed considering the structure of an upper half body, and consequently a problem resides in the fact that the degree of freedom in designing is deficient.

(3) In the parallel link for the robot driving mechanism disclosed in the Patent reference 2, each unit link is constituted by the first and second arms serially connected with each other. Thus, when the parallel link for robot driving mechanisms are employed in the left and right legs of the robot, the mechanisms interfere with each other and operations are offset, and consequently a problem resides in the fact that both the degree of freedom in designing and practicality are deficient.

In order to solve the above conventional problems, the present invention was made, and it is an object of the present invention to provide a lower half body module of a bipedal walking robot which is excellent in practicality in the point that it is possible to transport a heavy load, and which is excellent in the degree of freedom in designing in the point that it is possible to mount or incorporate an upper half body having a large weight. Therefore, this is why legs of the lower half body module are constituted by a parallel link mechanism to sustain a large load.

DISCLOSURE OF THE INVENTION

In order to solve the above-described problems, a lower half body module of a bipedal walking robot according to the present invention has the constitutions described below.

The lower half body module of the bipedal walking robot according to Claim 1 of the present invention is constituted so as to include a base, a right foot and a left foot, a plurality of passive joints which are respectively provided on the base, the right foot and the left foot, and parallel link mechanism portions which are respectively provided between the passive joint provided on the base and the passive joints provided on the right foot and between the passive joint provided on the base and the passive joints provided on the left foot. Further, the lower half body module of the bipedal walking robot is constituted so as to include as said passive joints: base side passive joints having overturned U-shaped base side upper couplings fixed to the base, overturned U-shaped base side lower couplings fixed to ends of the linear motion links, and connecting rotating portions which orthogonally and rotatably connect the base side upper coupling with the base side lower coupling; and foot side passive joints having overturned U-shaped foot side upper couplings fixed to another ends of the linear motion links, overturned U-shaped foot side lower couplings rotatably fixed to said feet, and connecting rotating portions which orthogonally and rotatably connect said foot side upper coupling with the foot side lower coupling.

By this constitution, the lower half body of the bipedal walking robot has operations as described below.

(1) Legs of the lower half body module are formed by parallel link mechanism portions in which a plurality of links are respectively provided in parallel between the base and the right foot and between the base and the left foot, and therefore, a load is divided into each link, the legs can sustain a large load and rigidity can be raised, and output power of the right foot and left foot can be enlarged. As a result, a heavy load can be mounted or transported, etc., and in this point, it is excellent in practicality.

(2) The legs of the lower half body module are respectively formed by parallel link mechanism portions in which a plurality of links are provided in parallel between the base and the right foot and between the base and the left foot, and therefore, high precision positioning can be performed by averaging a positional error of the right foot or left foot with errors of movable displacement of the links during walking operation, and it is excellent in productivity since a high resolution is not required for a detector for detecting the displacement of the links.

(3) Compensating operation of an upper half body is not required for operation of the legs of the lower half body module, and therefore, the upper half body having a large weight can be mounted or incorporated, and in this point, it is excellent in the degree of freedom in designing.

(4) The legs of the lower half body module are formed by parallel link mechanism portions, and therefore, it is easy to calculate a reverse kinematics for controlling the operation, a load of a computer for generating a walking pattern can be reduced.

(5) The legs of the lower half body module are formed by parallel link mechanism portions, and therefore, when the lower half body module assumes a low posture, load torques on actuators of the links can be reduced in comparison with a serial mechanism and power of the actuator can be saved. In this point, it is excellent in energy savings.

(6) A plurality of links which constitute the parallel link mechanism portion may have the same structure. Therefore, it is excellent in cost savings and power savings, and maintainability can be improved.

(7) Ends of the linear motion link are respectively connected with the base and the foot by the base side passive joint having two degrees of freedom and the foot side passive joint having three degrees of freedom, and therefore each passive joint follows telescopic motion of the linear motion links without preventing it from being smoothly driven by the linear motion links. Thus, it is possible to stably operate, and the movable range can be widely established.

(8) The right foot and the left foot can operate back and forth, right and left, up and down and in the axis circumferential directions respectively making longitudinal, lateral and vertical directions axis, because each parallel link mechanism portion of the right and left legs is formed with six degrees of freedom. Therefore, various operations and smooth walking operation can be performed.

Here, the parallel link mechanism portions are respectively provided between the base and the right foot and between the base and the left foot, a plurality of links are respectively provided in parallel on each parallel link mechanism portion.

As the link, various objects such as an object having a feeding screw mechanism with a motor, a linear motion link using an oil hydraulic cylinder, a hydraulic cylinder, a pneumatic cylinder or a linear motion type actuator, etc., or an object which connects two of more cylindrical members by driving joints are employed. Moreover, when the linear motion links are employed, each link extends/contracts in an axis direction thereof and therefore, does not interfere with each other. Thus, it is possible to miniaturize a device.

A lower half body module of a bipedal walking robot according to Claim 2 is constituted so as to include the respective three couples of parallel link mechanism portions which are respectively provided between the base and the right foot and between the base and the left foot in the invention according to Claim 1.

By this constitution, the lower half body module of the bipedal walking robot has an operation as described below in addition to the operation of Claim 1.

(1) Each parallel link mechanism portion which is employed in the right and left legs is constituted by a Stuart platform, in which two links as a set are provided in a V-shape and the three sets are provided. Therefore, it is excellent in stability and rigidity, and operation control can be simplified.

Here, it is preferable that the respective parallel link mechanism portions employed in the right and left legs of the lower half body module are symmetrically provided at both sides of the center of the base. Further, it is preferable that the links employed in the parallel link mechanism portions are symmetrically provided at the right and left legs in the same manner. Thus, ZMP (Zero Moment Point) control for controlling walking operation can be performed, and it is excellent in stability during walking operation.

A lower half body module of a bipedal walking robot according to Claim 3 is constituted in such a way that the parallel link mechanism portions respectively have six degrees of freedom in the inventions according to Claim 1 or 2.

By this constitution, the lower half body module of the bipedal walking robot has operations as described below in addition to the operations of Claim 1 or 2.

(1) The right and left legs can perform various operations and walking operation can be smoothly performed owing to six degrees of freedom of each parallel link mechanism portion.

(2) When the parallel link mechanism portion of the right leg and the parallel link mechanism portion of the left leg are symmetrically provided, walking control can be performed so that a moment of an axis circumferential direction is not applied to a waist axis of the lower half body module during walking operation, since each parallel link mechanism portion has six degrees of freedom. Therefore, the base does not rotate in the circumferential direction of the waist axis during walking, and stable walking can be performed.

A lower half body module of a bipedal walking robot according to Claim 4 is constituted so as to include a plurality of linear motion links capable of freely telescoping as links of the parallel link mechanisms in the invention according to any one of Claims 1 to 3, the linear motion links being respectively provided between the base and the right foot and between the base and the left foot via the passive joints.

By this constitution, the lower half body module of the bipedal walking robot has operations as described below in addition to the operations of any one of Claims 1 to 3.

(1) By employing the linear motion links, whose movable directions are longitudinal directions of the links, as links of the parallel link mechanism portions, the linear motion links do not interfere with each other. Therefore, it is possible to miniaturize and compact a device and excellent in the degree of freedom in designing.

(2) By employing the linear motion links, whose movable directions are longitudinal directions of the links, as links of the parallel link mechanism portions, a difference between loads applied to an actuator of the linear motion link between extension motion and contraction motion of the linear motion link is kept small. Therefore, when the lower half body module assumes a low posture, load torques applied to the actuators can be reduced, power of the actuators can be suppressed, and in this point, it is excellent in energy savings.

(3) Only expansion and contraction powers are applied to each linear motion link and a bending moment is not applied to each linear motion link. Therefore, it is excellent in strength and rigidity, and excellent in the degree of freedom in designing in the point that the selection range of materials or shapes is widened.

A lower half body module of a bipedal walking robot according to Claim 5 has a constitution that the links of the parallel link mechanism portions include linear motion type actuators as each actuator in the invention according to any one of Claims 1 to 4.

By this constitution, the lower half body module of the bipedal walking robot has an operation as described below in addition to the operation of any one of Claims 1 to 4.

(1) The linear motion type actuator can be employed to telescope the linear motion link in the longitudinal direction thereof, and therefore, the number of parts can be reduced, and high precision displacement control can be easily performed.

A lower half body module of a bipedal walking robot according to Claim 6 has a constitution that the linear motion type actuators are provided at the base sides of the linear motion links in the invention according to Claim 5.

By this constitution, the lower half body module of the bipedal walking robot has an operation as described below in addition to the operation of Claim 5.

(1) Both weights of the linear motion links on the right foot side and the left foot side can be reduced and power causing the right and left feet to operate can be reduced, since the linear motion type actuators are provided at the base side. Therefore, it is excellent in energy savings and stability.

BEST MODE FOR CARRYING OUT THE INVENTION

Embodiments of the present invention will be explained below referring to the accompanying drawings.

First Embodiment

Figure 1A:
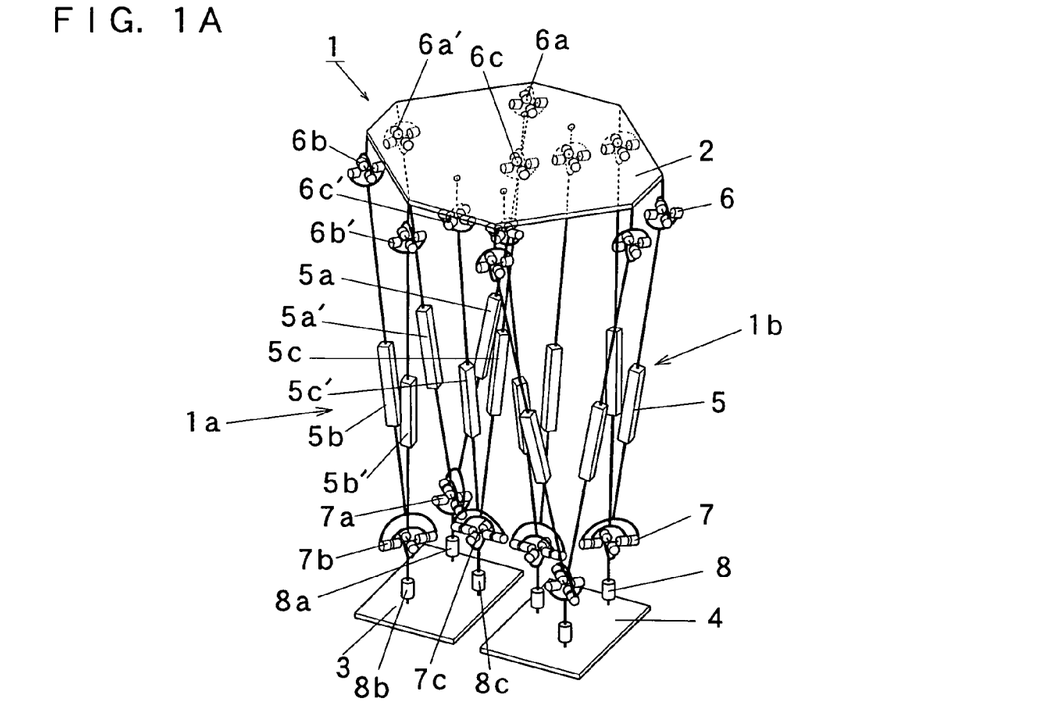
FIG. 1A is a schematic perspective view showing a lower half body module of a bipedal walking robot of a first embodiment.
Figure 1B:
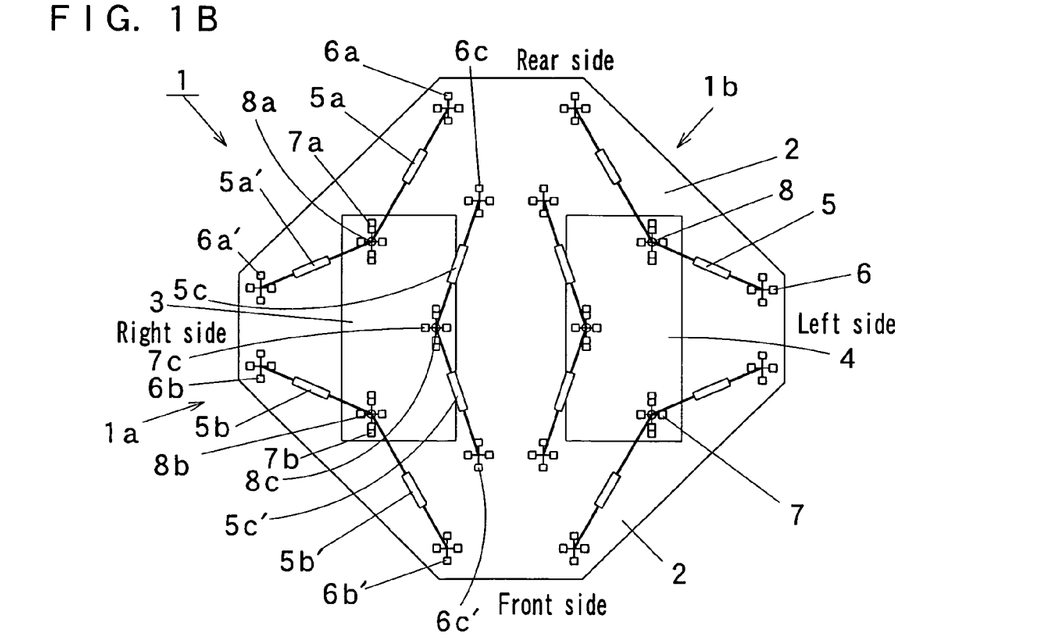
FIG. 1B is a schematic plane view showing the lower half body module of the bipedal walking robot of the first embodiment.

FIG. 1A is a schematic perspective view showing a lower half body module of a bipedal walking robot of a first embodiment, and FIG. 1B is a schematic plane view showing the lower half body module of the bipedal walking robot of the first embodiment.

In FIG. 1, reference symbol 1 denotes the lower half body module of the bipedal walking robot of the first embodiment, 1a denotes a parallel link mechanism portion of a right leg, 1b denotes a parallel link mechanism portion of a left leg, 2 denotes a base, 3 denotes a right foot, 4 denotes a left foot, 5a, 5a', 5b, 5b', 5c and 5c' respectively denote a linear motion link, 6a, 6a', 6b, 6b', 6c and 6c' respectively denote a base side passive joint, 7a, 7b and 7c respectively denote a foot side passive joint and 8a, 8b and 8c respectively denote a rotating passive joint. Moreover, each part of the parallel link mechanism portion 1b of the left leg is symmetric to each part of the parallel link mechanism portion 1a of the right foot, and has the same constitution, accordingly, an explanation regarding the left foot will be omitted.

Here, the base side passive joints 6a and 6a' are provided at a right rear side of a lower surface of the base 2. The foot side passive joint 7a is provided at a right rear side of the right foot 3, the rotating passive joint 8a is provided under the foot side passive joint 7a. An upper end of the linear motion link 5a is connected with the base side passive joint 6a, a lower end of the linear motion link 5a is connected with the foot side passive joint 7a. An upper end of the linear motion link 5a' is connected with the base side passive joint 6a', a lower end of the linear motion link 5a' is connected with the foot side passive joint 7a.

The base side passive joints 6b and 6b' are provided at a right front side of the lower surface of the base 2. The foot side passive joint 7b is provided at a right front side of the right foot 3, the rotating passive joint 8b is provided under the foot side passive joint 7b. An upper end of the linear motion link 5b is connected with the base side passive joint 6b, a lower end of the linear motion link 5b is connected with the foot side passive joint 7b. An upper end of the linear motion link 5b' is connected with the base side passive joint 6b', a lower end of the linear motion link 5b' is connected with the foot side passive joint 7b.

The base side passive joints 6c and 6c' are provided at a right center of the lower surface of the base 2. The foot side passive joint 7c is provided at a right center of the right foot 3, the rotating passive joint 8c is provided under the foot side passive joint 7c. An upper end of the linear motion link 5c is connected with the base side passive joint 6c, a lower end of the linear motion link 5c is connected with the foot side passive joint 7c. An upper end of the linear motion link 5c' is connected with the base side passive joint 6c', a lower end of the linear motion link 5c' is connected with the foot side passive joint 7c.

The parallel link mechanism portion 1a of the right leg and the parallel link mechanism portion 1b of the left leg are thus provided on the both sides of the base 2 respectively so as to be symmetrical to the center thereof. Thus, the ZMP control for walking operation controlling can be performed, and is excellent in stability during walking operation.

Further, the respective linear motion links 5, 5a, 5a', 5b, 5b', 5c and 5c' (referred to as linear motion links 5 and 5a to 5c' hereinafter) are formed to freely telescope using a feeding screw mechanism with a motor or a linear motion type actuator such as an oil hydraulic cylinder, a hydraulic cylinder, a pneumatic cylinder, etc., and are respectively formed with one degree of freedom indicating telescopic motion in a longitudinal direction of the linear motion link. The base side passive joints 6, 6a, 6a', 6b, 6b', 6c and 6c' (referred to as base side passive joints 6 and 6a to 6c' hereinafter) are made orthogonal to the longitudinal directions of the linear motion links 5 and 5a to 5c' respectively, and are respectively formed with two degrees of freedom indicating rotating in each axis circumferential direction of two orthogonal axes. The foot side passive joints 7, 7a, 7b and 7c are made orthogonal to the longitudinal directions of the linear motion links 5 and 5a to 5c' respectively, and are respectively formed with two degrees of freedom indicating rotating in each axis circumferential direction of two orthogonal axes. The rotating passive joints 8, 8a, 8b and 8c are respectively formed with one degree of freedom indicating rotating in each axis circumferential direction of the linear motion links 5 and 5a to 5c'.

The parallel link mechanism portions 1a and 1b are thus respectively formed with six degrees of freedom, and therefore the right foot 3 and the left foot 4 can operate back and forth, right and left, up and down and in the axis circumferential directions making longitudinal, lateral and vertical directions as axes, various operations can be performed, and walking operation can be smoothly performed.

Further, the parallel link mechanism portion 1a of the right leg and the parallel link mechanism portion 1b of the left leg are provided at the both sides of the base 2 respectively so as to be symmetrical to the center thereof, and each of the parallel link mechanism portions 1a and 1b has six degrees of freedom, and therefore walking control can be performed so that a moment is not applied to a waist axis of the lower half body module 1 during walking operation, that is, an axis circumferential direction of an axis which passes through the center of the base 2 and is orthogonal thereto. Thus, the base 2 does not rotate in the axis circumferential direction of the waist axis during walking, and stable walking without falling can be performed.

The operation of the lower half body of the bipedal walking robot of the embodiment 1 constituted as described above will be explained below with reference to the drawings. In embodiment 1, the operation of the right foot of the lower half body module 1 will be explained. An explanation of the operation of the left leg will be omitted because it is similar to the operation of the right leg.

When the right leg is operated, a reverse kinematics of the right foot 3 is calculated based on a predetermined walking pattern, each actuator (not shown) of the linear motion links 5a to 5c' is driven based on the calculated value, and the linear motion links 5a to 5c' are telescoped. The base side passive joints 6a to 6c' provided at connecting portions between the linear motion links 5a to 5c' and the base 2 respectively, the foot side passive joints 7a to 7c provided at connecting portions between the linear motion links 5a to 5c' and the right foot 3 respectively and the rotating couplings 8a to 8c follow the telescopic motion of the linear motion links 5a to 5c' without preventing it from being smoothly driven by the linear motion links. Each driving of the linear motion links 5a to 5c' is detected by a detector (not shown) such as a rotary encoder, etc., provided in each linear motion link, an obtained detection value is fed back as angle data, and the linear motion links 5a to 5c' are subject to feed back control. Thus, the right foot 3 can perform one step forward operation or stepping operation, etc. Further, the right foot 3 and the left foot 4 mutually and continuously perform such an operation, whereby walking operation can be performed.

The lower half body of the bipedal walking robot of the first embodiment is constituted as described above, and has operations as described below.

(1) The legs of the lower half body module 1 are formed by parallel link mechanism portions 1a and 1b in which a plurality of the linear motion links 5 are respectively provided in parallel between the base 2 and the right foot 3 and between the base 2 and the left foot 4, and therefore, load is divided into each of the linear motion links 5, the legs can sustain a large load and rigidity can be raised, the output power of the right foot and left foot can be raised. As a result, a heavy load can be mounted or transported, and in this point, it is excellent in practicability.

(2) High precision positioning can be performed by averaging a positional error of the right foot 3 or left foot 4 by errors of movable displacement of the linear motion links during walking operation, and it is excellent in productivity since a high resolution ability is not required for a detector for detecting the displacement of the linear motion link 5.

(3) Compensating operation of an upper half body is not required for operation of the legs of the lower half body module 1, and therefore the upper half body having a large weight can be mounted or incorporated, and in this point, it is excellent in the degree of freedom in designing.

(4) The legs of the lower half body module 1 are formed by the parallel link mechanism portions 1a and 1b, and therefore, it is easy to calculate a reverse kinematics for controlling the operation, a load of a computer for generating a walking pattern can be reduced.

(5) In comparison with a serial link mechanism, when the lower half body module assumes a low posture, load torques applied on the actuators of the linear motion links 5 can be reduced and power of the actuator can be saved. In this point, it is excellent in energy savings.

(6) The linear motion links 5 which constitute the parallel link mechanism portions 1a and 1b may have the same structure, and therefore, it is excellent in cost savings and power savings in manufacturing, and maintainability can be improved.

(7) The parallel link mechanism portions 1a and 1b which are respectively employed in the right and left legs are constituted by a Stuart platform, in which two linear motion links 5 as a set are provided in a V-shape and the three sets are provided. Therefore, it is excellent in stability and rigidity, and operation control can be simplified.

(8) Only expansion and contraction powers are applied to each linear motion link 5 and a bending moment is not applied to each linear motion link 5. Therefore, it is excellent in strength and rigidity, and it is excellent in the degree of freedom in designing in the point that a selection range of materials or shapes is widened.

Second Embodiment

Figure 2:
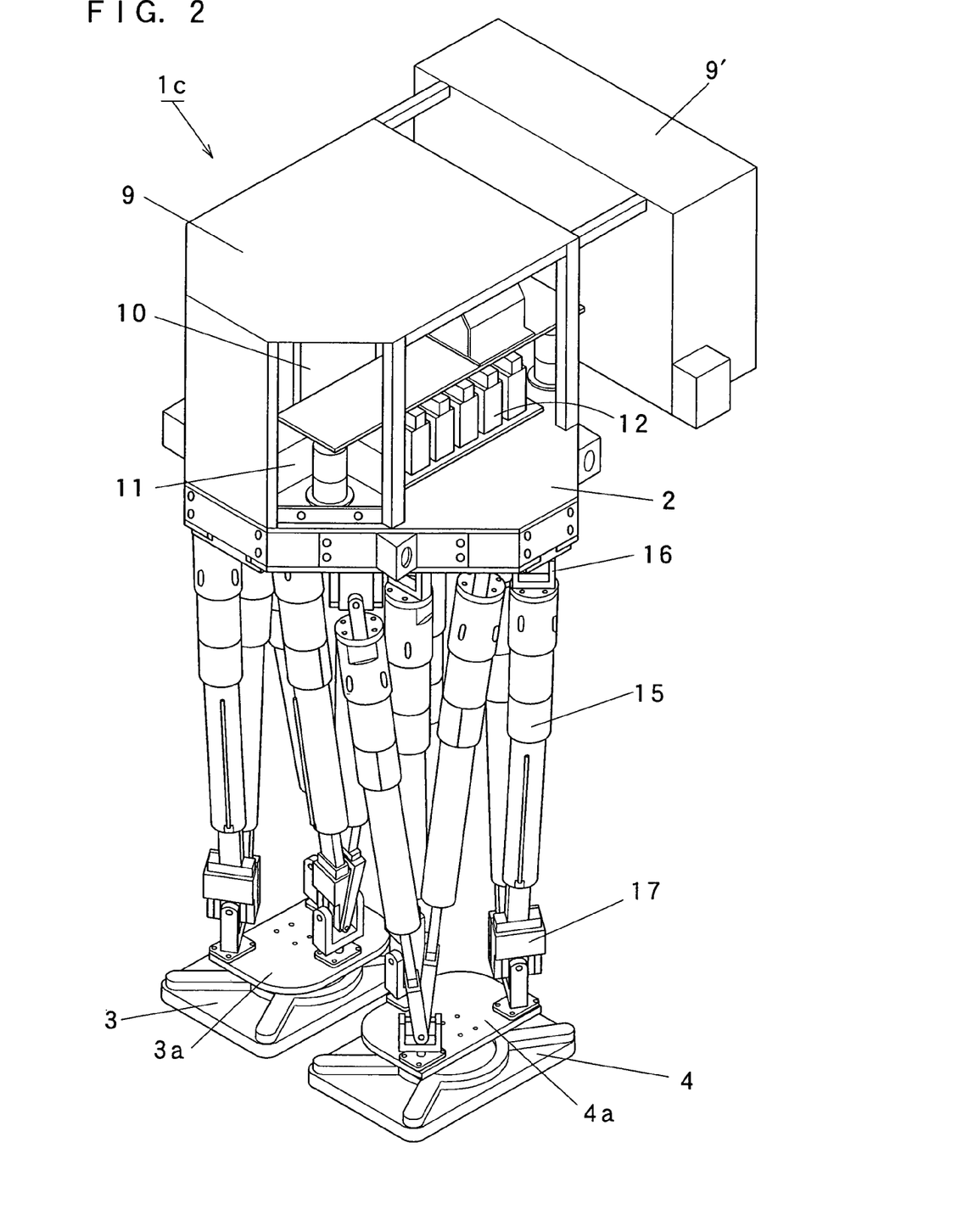
FIG. 2 is a perspective view showing a lower half body module of a bipedal walking robot of a second embodiment.

FIG. 2 is a perspective view showing a lower half body module of a bipedal walking robot of a second embodiment.

In FIG. 2, reference symbol 1c denotes the lower half body module of the bipedal walking robot of the second embodiment, 2 denotes a base, 3 denotes a right foot, 3a denotes a flat fixed plate fixed to an upper portion of the right foot 3, 4 denotes a left foot, 4a denotes a flat fixed plate fixed to an upper portion of the left foot 4, 9 denotes a controller provided on an upper surface of the base 2, 9' denotes a computer for controlling provided on a rear portion of the controller 9, 10 denotes a gyro, 11 denotes a battery, 12 denotes a motor driving circuit portion, 15 denotes linear motion links respectively provided between the base 2 and the right foot 3 and between the base 2 and the left foot 4, 16 denotes a base side passive joint fixed to a predetermined position of a lower surface side of the base 2, 17 denotes foot side passive joints rotatably fixed to predetermined positions of upper surfaces of the fixed plate 3a on the right foot 3 and the fixed plate 4a on the left foot 4 respectively.

Here, in the second embodiment, the linear motion link 15 is formed so as to freely telescope in the longitudinal direction thereof by a feeding screw mechanism described below. In place of the feeding screw mechanism, a mechanism using a cylinder using an oil hydraulic pressure, a hydraulic pressure, a pneumatic pressure, etc., or a linear motion type actuator may be employed. Further, each upper end of two linear motion links 15 as a set is connected with the base side passive joint 16, lower ends thereof are integrally connected with the foot side passive joint 17, as a whole, the linear motion links 15 are provided in V-shape. Three sets of the linear motion links are respectively provided in a plane view triangular form in the right legs and left legs, six links in one leg, a total of twelve links being provided. That is, the right and left legs of the lower half body module of the bipedal walking robot 1c of the second embodiment are respectively constituted by a Stuart platform. Thus, it is excellent in stability and strength. Further, one base side passive joint 16 is connected with the upper end of one linear motion link 15, one foot side passive joint 17 is connected with the lower ends of the two linear motion links 15.

The gyro 10, the battery 11, and the motor driving circuit portion 12 are provided in the controller 9. In the second embodiment, a nickel-hydrogen battery is employed as the battery 11.

A six-axis force sensor for detecting floor reaction may be provided at bottom sides of the right foot 3 and the left foot 4. The 6-axis force sensor can simultaneously and continuously detect each force component of three axis directions and each moment component of three axis circumferential directions with high precision. Further, the ZMP control can be performed based on component values detected by the 6-axis force sensor.

Next, a structure of the linear motion link will be explained in detail with reference to the drawings.

Figure 3:
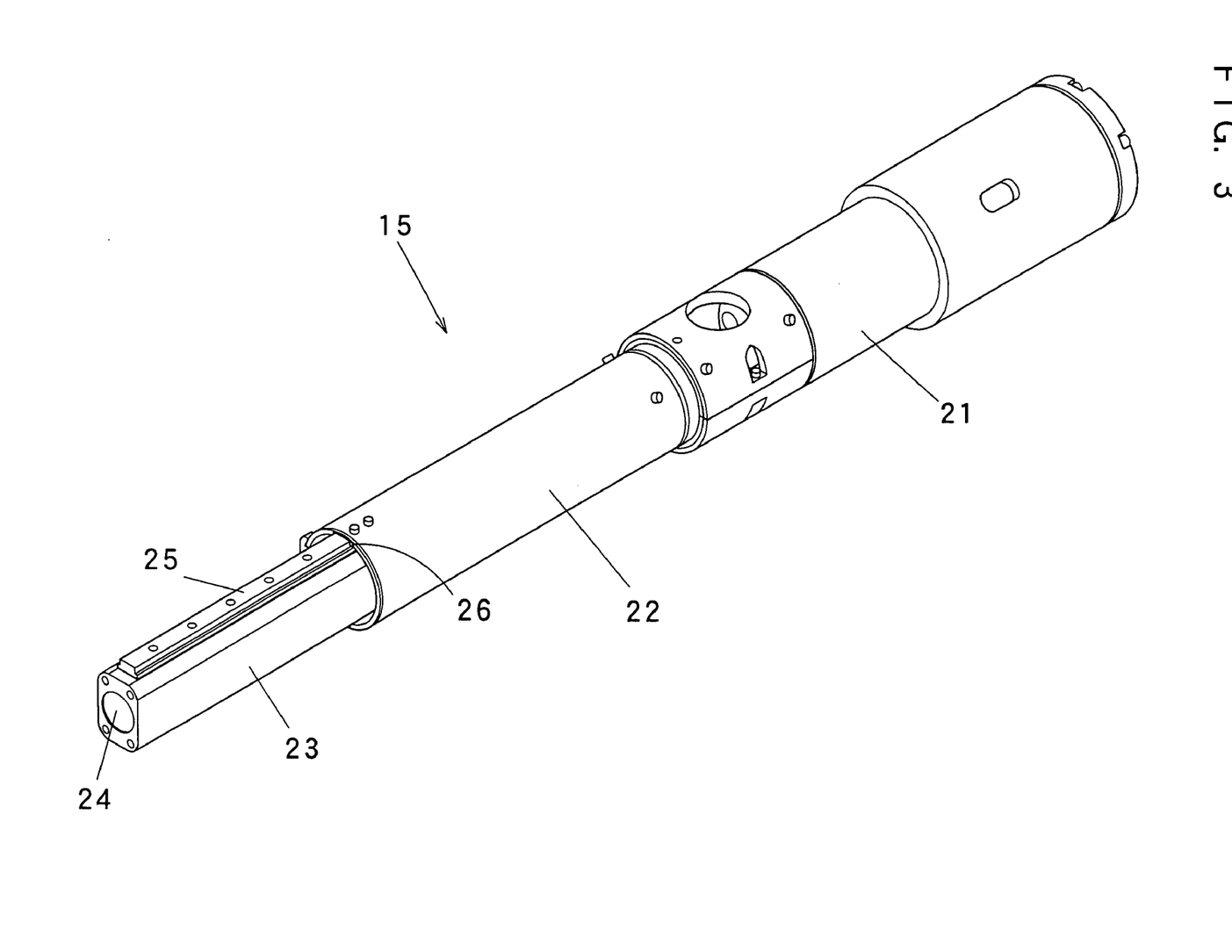
FIG. 3 is a perspective view showing a main portion of a linear motion link.
Figure 4A:
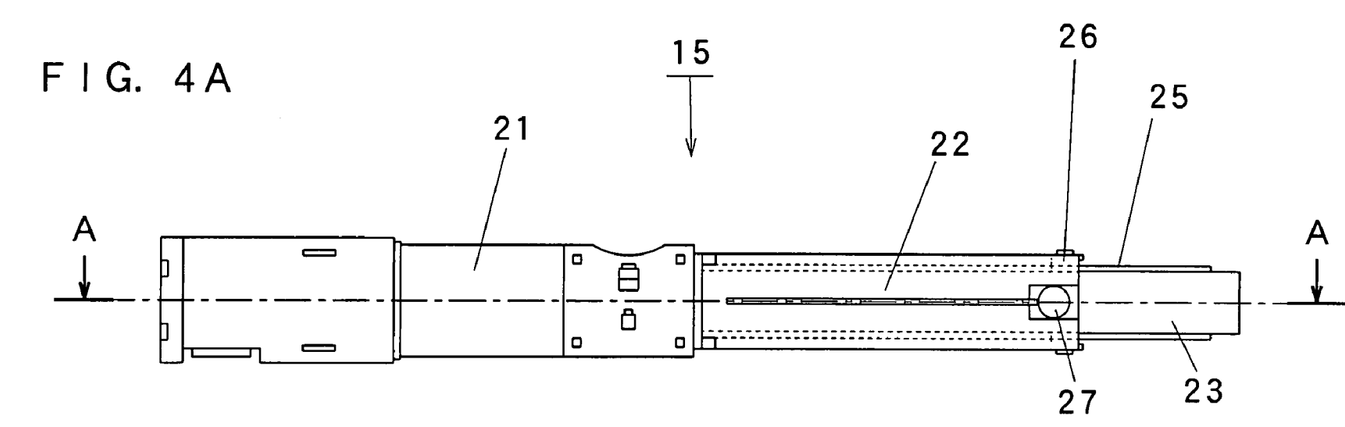
FIG. 4A is a side view showing a main portion of the linear motion link.
Figure 4B:
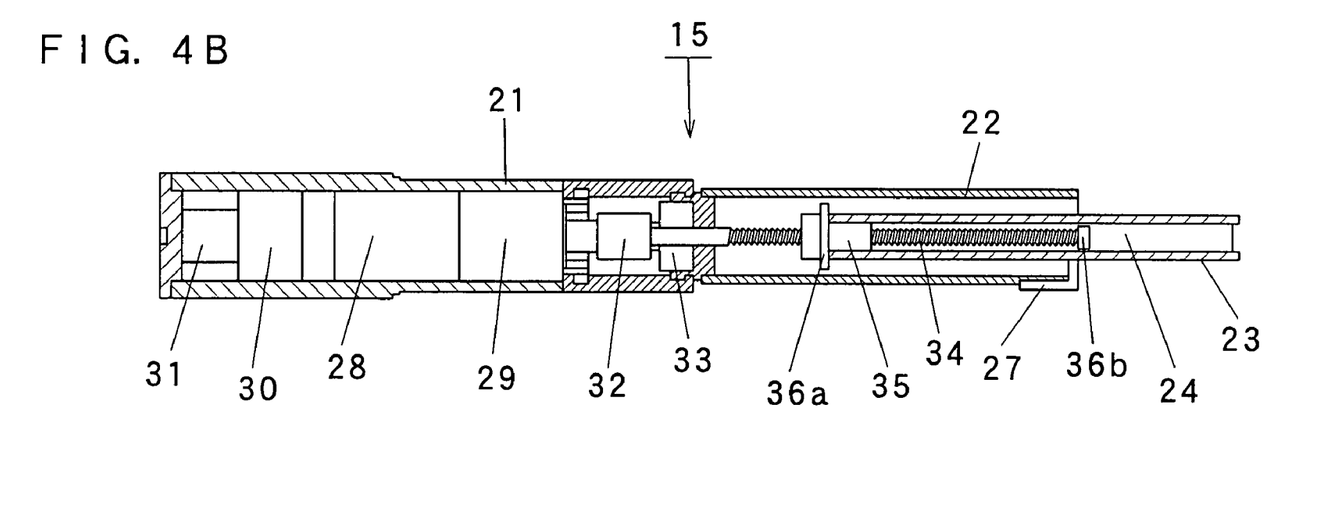
FIG. 4B is a cross sectional view taken along the line A-A in FIG. 4A from an arrow of the main portion.

FIG. 3 is a perspective view showing a main portion of a linear motion link, FIG. 4A is a side view showing the main portion of the linear motion link and FIG. 4B is a cross sectional view taken along the line A-A in FIG. 4A from an arrow of the main portion.

In FIG. 3 and FIG. 4, reference symbol 15 denotes a linear motion link, 21 denotes a holding casing holding a motor, a gear unit, a holding break, rotary encoder, etc., and so on which are described below, 22 denotes a hollow outer tube portion extended from the holding casing 21 and 23 denotes an inner rod portion which is inserted into the outer tube portion 22 and slides in the longitudinal direction of the linear motion link 15. The linear motion link 15 telescopes by sliding of the inner rod portion 23. Reference symbol 24 denotes a male screw shaft insertion hole formed in the inner rod portion 23 in a longitudinal direction thereof, 25 denotes a rod rail portion laid on an external periphery of the inner rod portion 23 in the longitudinal direction thereof, the rails vertically facing each other, 26 denotes a rail guide portion with which the rod rail portion 25 is engaged and in which the portion 25 slides, 27 denotes an initial position sensor which detects an initial position of the inner rod portion 23, 28 denotes the motor, 29 denotes the gear unit which reduces a rotating speed of an rotating shaft of the motor 28 to a predetermined rotating speed, 30 denotes the holding brake which fixes the rotating shaft of the motor 28 at non-energization and holds the inner rod portion 23, 31 denotes a rotary encoder which detects the rotation of the rotating shaft of the motor 28, 32 denotes a coupling which connects the rotating shaft passing through the gear unit 29 with a male screw shaft portion described below, 33 denotes a bearing which supports the male screw shaft portion described below, 34 denotes the male screw shaft portion which is inserted and provided in the male screw shaft insertion hole 24 of the inner rod 23 inside the outer tube 22 and whose external periphery is screw-threaded, 35 denotes a female screw nut portion which is fixed in the male screw shaft insertion hole 24 in an end of the inner rod portion 23 inside the outer tube portion 22 and screw-engages with the mail screw shaft portion 34, and 36a and 36b respectively denote a stopper.

Here, in the second embodiment, a duracon of acetal based plastic of lightweight and relatively high strength is employed as the material of the holding casing 21 and the outer tube portion 22. Further, a photomicrosensor is employed as the initial position sensor 27.

The motor 28 can be cooled by forming a slit for cooling or an air-cooling fin in the holding casing 21 which holds the motor 28, the gear unit 29, the holding brake 30 and the rotary encoder 31. Thus, a load to the motor 28 can be reduced. Further, the fan for cooling may be provided in the system for the same object, and the same effect with the monitor 28 can be obtained.

The motor 28, the gear unit 29, the holding brake 30 and the rotary encoder 31 are provided in the casing 21 provided at the base 2 side of the linear motion link 15. Thus, weights of the right foot 3 side and left foot 4 side of the linear motion links 15 can be reduced. Therefore, power for operating the right foot 3 and the left foot 4 can be reduced, and in this point, it is excellent in power savings and stability.

Further, in the second embodiment, a slidable screw is employed to screw-engage the male screw shaft portion 34 with the female screw nut portion 35. Thus, the inner rod portion 23 can be slid at high speed, a walking speed can be improved. Moreover, a ball screw may be employed for screw-engaging the male screw shaft portion 34 with the female screw nut portion 35 in addition to the slidable screw. When the ball screw is employed, a friction resistance of the screw-engaging portion can be reduced, however, a size of a device becomes large, or establishment of a lead angle is limited. Therefore, it is preferable that either slidable screw or ball screw is selected by considering a size of a device or a required movable speed, etc.

As shown in FIG. 3 and FIG. 4, when the motor 28 is driven, the rotating shaft thereof rotates, and the male screw shaft portion 34 rotates with a rotating speed reduced by the gear unit 29 based on a predetermined reducing speed ratio. The female screw nut portion 35 fixed to the inner rod portion 23 is screw-engaged with the male screw shaft portion 34. Here, the inner rod portion 23 slides in a longitudinal direction thereof, but does not rotate in an axis circumferential direction thereof, since the rod rail portion 25 provided on an external peripheral surface of the inner rod portion 23 is engaged with the rail guide portion 26. Thus, when the male screw shaft portion 34 rotates, the inner rod portion 23 slides in the longitudinal direction thereof by the feeding screw mechanism via the female screw nut portion 35. And thus, telescopic motion of the linear motion links 15 is performed.

Then, a structure of the base side passive joint will be explained in detail with reference to the drawing.

Figure 5:
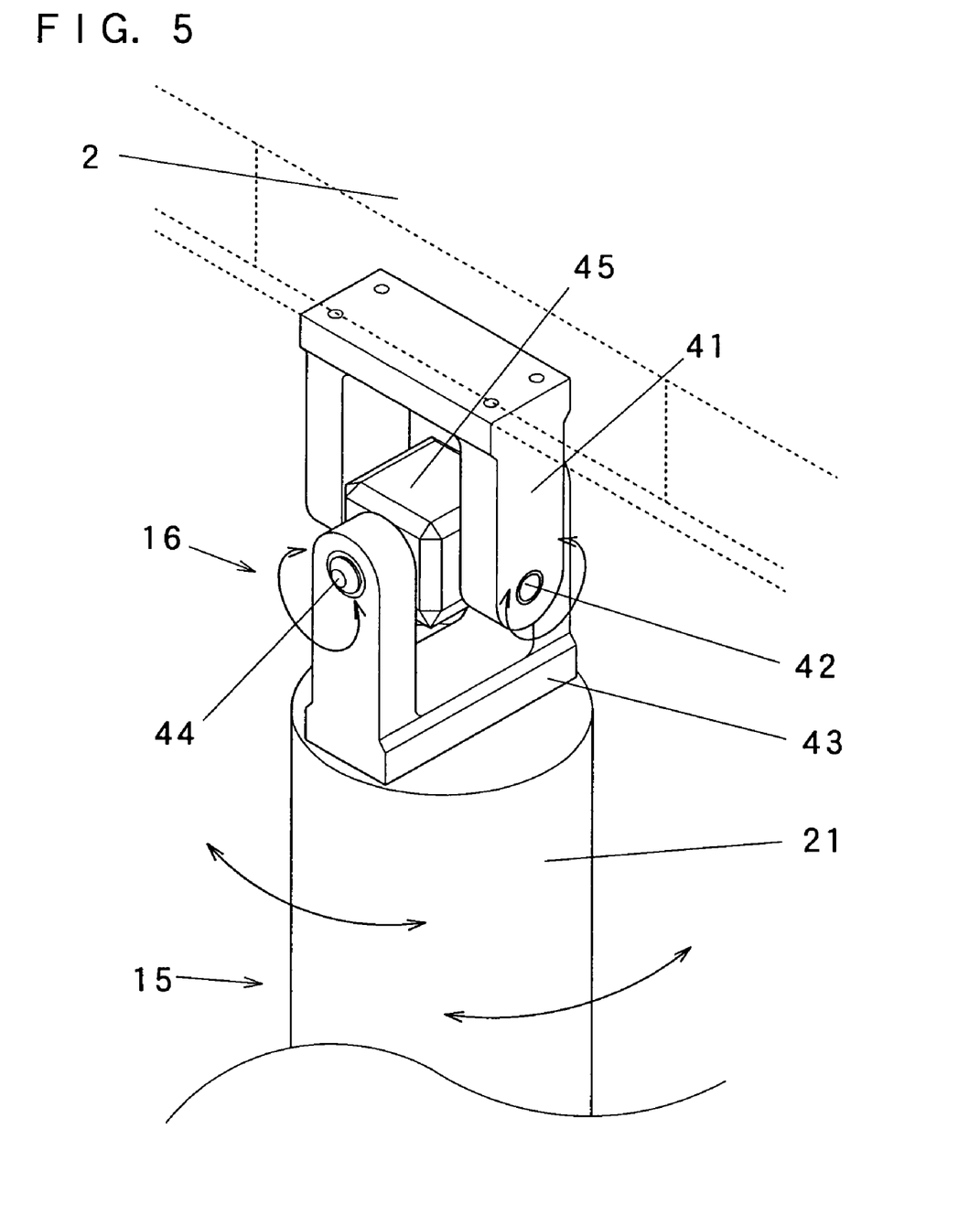
FIG. 5 is a perspective view showing a main portion of a base side passive joint.

FIG. 5 is a perspective view showing a main portion of a base side passive joint.

In FIG. 5, reference symbol 2 denotes a base, 15 denotes a linear motion link, 16 denotes a base side passive joint, 21 denotes a holding casing of the linear motion link 15, 41 denotes an overturned U-shaped base side upper coupling fixed to a lower surface of the base 2, 42 denotes an upper coupling shaft installed on a side facing the surface on which the base side upper coupling 41 is provided, 43 denotes an overturned U-shaped base side lower coupling fixed to an upper end of the holding casing 21 side of the linear motion link 15, 44 denotes a lower coupling shaft that is installed on a side facing the surface on which the base side lower coupling 43 is provided and that rotatably and pivotally supports the base side lower coupling 43, and 45 denotes a connecting rotating portion which makes the upper coupling shaft 42 orthogonal to the lower coupling shaft 44 and connects the upper coupling shaft 42 with the lower coupling shaft 44.

As shown in FIG. 5, the base side lower coupling 43 rotates in each axis circumferential direction of the upper coupling shaft 42 and the lower coupling shaft 44 to the base side upper coupling 41. Thus, the base side passive joint 16 has two degrees of freedom in each axis circumferential direction of the upper coupling shaft 42 and the lower coupling shaft 44, which are orthogonal to the longitudinal direction of the linear motion link 15. Therefore, the base side passive joint 16 follows telescopic motion of the linear motion link 15 without preventing it from being smoothly driven by the link 15.

Furthermore, a structure of the foot side passive joint will be explained in detail with reference to the drawing.

Figure 6:
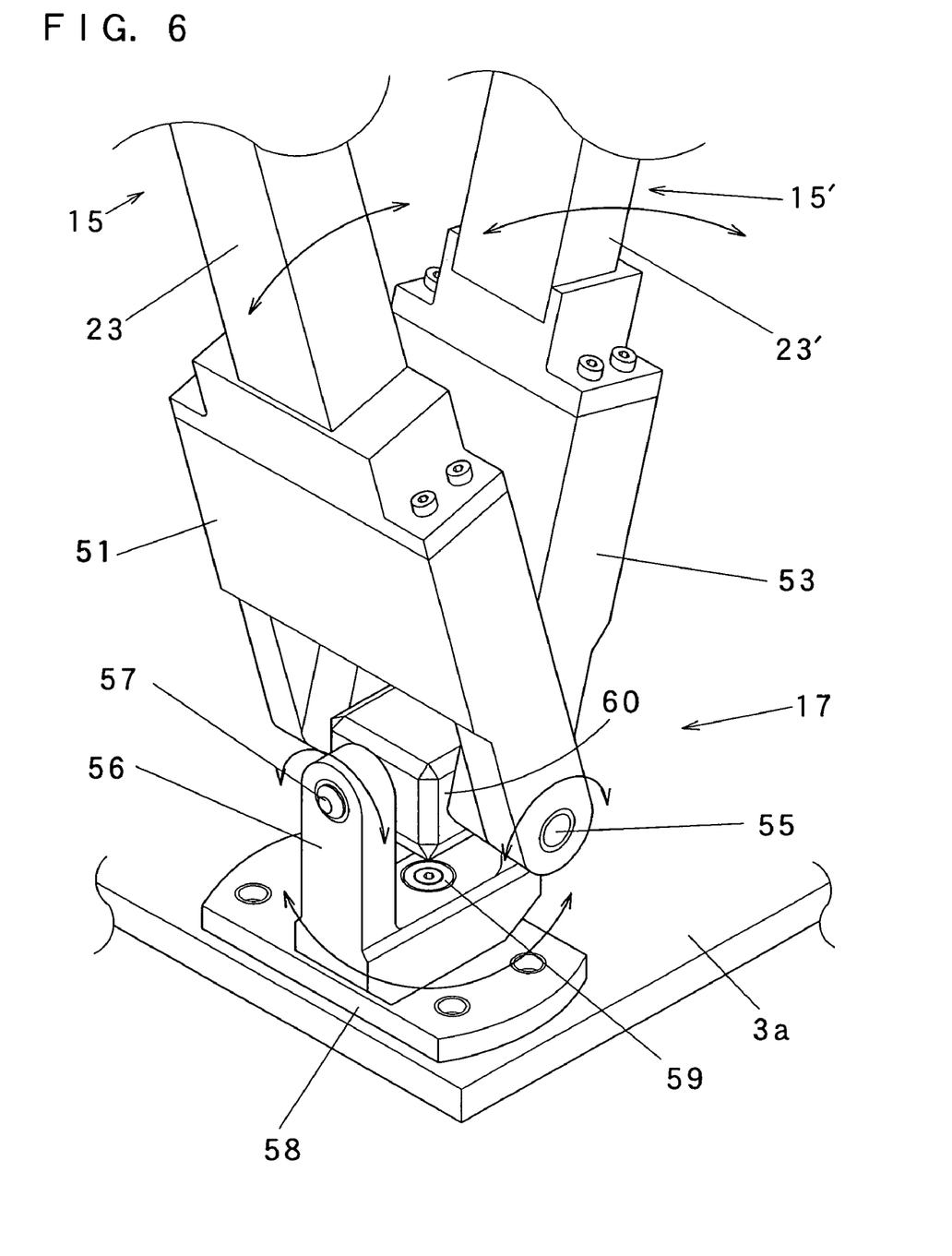
FIG. 6 is a perspective view showing a main portion of a foot side passive joint.

FIG. 6 is a perspective view showing a main portion of a foot side passive joint.

In FIG. 6, reference symbol 3a denotes a fixed plate, 15 and 15' respectively denote a linear motion link, 17 denotes a foot side passive joint, 23 denotes an inner rod portion of the linear motion link 15, 23' denotes an inner rod portion of the linear motion link 15', 51 denotes an overturned U-shaped first foot side upper coupling connected with a lower end of the inner rod 23, 53 denotes an overturned U-shaped second foot side upper coupling connected with a lower end of the inner rod 23' and 55 denotes an upper coupling shaft that is installed on a side facing a surface on which the first foot side upper coupling 51 and the second foot side upper coupling 53 are provided, connects the first foot side upper coupling 51 with the second foot side upper coupling 53 and rotatably and pivotally supports each coupling, and 56 denotes an overturned U-shaped foot side lower coupling connected with the fixed plate 3a via a foot side base described below, 57 denotes a lower coupling shaft installed on a side facing a surface on which the foot side lower coupling 56 is provided, 58 denotes the foot side base fixed to the fixed plate 3a, 59 denotes a base shaft which rotatably and pivotally supports the foot side lower coupling 56 to the foot side base 58, and 60 denotes a connecting rotating portion which makes the upper coupling shaft 55 orthogonal to the lower coupling shaft 57 and connects the upper coupling shaft 55 with the lower coupling shaft 57.

As shown in FIG. 6, the first foot side upper coupling 51 and the second foot side lower coupling 53 rotate in axis circumferential directions of the upper coupling shaft 55 and the lower coupling shaft 57 to the foot side lower coupling 56 respectively. Further, the foot side lower coupling 56 rotates in an axis circumferential direction of the base shaft 59 to the foot side base 58. Thus, the foot side passive joint 17 has two degrees of freedom in each axis circumferential direction of the upper coupling shaft 55 and the lower coupling shaft 57, which are orthogonal to the longitudinal direction of the linear motion link 15, and has one degree of freedom in an axis circumferential direction of the base shaft 59 in an axis direction of the linear motion link 15. Therefore, the base side passive joint 17 follows telescopic motion of the linear motion link 15 without preventing it from being smoothly driven by the link 15.

An explanation of walking operation of the lower half body module of the bipedal walking robot of the second embodiment constituted as described above will be omitted because the walking operation is similar to the walking operation explained in the first embodiment.

The lower half body module of the bipedal walking robot of the second embodiment is constituted as described above, and has operations as described below.

(1) The linear motion links 15 do not interfere with each other by employing the linear motion links 15, and therefore it is possible to miniaturize and compact a device. In this point, it is excellent in the degree of freedom in designing.

(2) A difference between a load applied to the motor 28 during expansion of the linear motion link 15 and a load applied to the motor 28 during contraction of the linear motion link 15 is kept small by employing the linear motion link 15, and therefore when the lower half body module 1c assumes a low posture, load torques applied to the motor 28 can be reduced, power consumption of the motor 28 can be saved. In this point, it is excellent in energy savings.

(3) The right and left legs of the lower half body module of the bipedal walking robot 1c are formed by the parallel link mechanisms in which a plurality of the linear motion links 15 are respectively provided between the base 2 and the right foot 3 and between the base 2 and the left foot 4, and therefore, the legs can sustain a large load, a heavy load can be transported. In this point, it is excellent in practicability. Further, compensating operation is not required for the operation of the legs of the lower half body module of the bipedal walking robot 1c, and therefore an upper half body having a large weight can be mounted or incorporated. In this point, it is excellent in the degree of freedom in designing.

(4) A positional error of the right foot 3 or left foot 4 with errors of movable displacement of the linear motion links 15 during walking operation is averaged, and therefore operation with high precision can be performed. Further, a high resolution ability is not required for the rotary encoder 31 for detecting the displacement of the linear motion links 15, and therefore it is excellent in productivity.

(5) Only expansion and contraction powers are applied to each linear motion link 15 and a bending moment is not applied to each linear motion link. Therefore, it is excellent in strength and rigidity, and it is excellent in the degree of freedom in designing in the point that a selection range of materials or shapes is widened. Further, the inner rod portion 23 are slid by the feeding screw mechanism using the male screw shaft portion 34 and the female screw nut portion 35, and therefore control becomes easy and it is excellent in strength and rigidity.

(6) A plurality of linear motion links 15 may have the same structure with each other, and therefore it is excellent in cost savings and power savings, and maintainability can be improved.

(7) Two linear motion links as a set are provided in a V-shape, the three or more sets are provided in a plane view triangular shape in the right and left legs, that is, each leg of the lower half body module is constituted by a Stuart platform, and therefore it is excellent in stability and strength.

INDUSTRIAL APPLICABILITY

As explained above, according to a lower half body module of a bipedal walking robot of the present invention, effects as described below can be obtained.

By the invention according to Claim 1, (1) there can be provided a lower half body module of a bipedal walking robot which is excellent in practicality in the point that a heavy load can be placed or transported, etc. Therefore, this is why legs of the lower half body module are formed by parallel link mechanism portions, in which a plurality of links are respectively provided in parallel between a base and a right foot and between a base and a left foot, and therefore a load is distributed to each link, the legs can sustain a large load and rigidity can be raised, output power of the right foot and left foot is enlarged.

(2) There can be provided a lower half body module of a bipedal walking robot which is excellent in productivity. Therefore, this is why the legs of the lower half body module are formed by the parallel link mechanism portions, in which a plurality of links are respectively provided in parallel between the base and the right foot and between the base and the left foot, and therefore high precision positioning can be performed by averaging a positional error of the right foot or the left foot with errors of movable displacement of the links during walking operation, a high resolution ability is not required for a detector for detecting the displacement of the links.

(3) There can be provided a lower half body module of a bipedal walking robot which is excellent in the degree of freedom in designing, since compensating operation of an upper half body is not required for the operation of the legs of the lower half body module and therefore an upper half body having a large weight can be mounted or incorporated.

(4) There can be provided a lower half body module of a bipedal walking robot capable of reducing a load of a computer generating a walking pattern, since the legs of the lower half body module are formed by the parallel link mechanism portions and therefore it is easy to calculate a reverse kinematics for operation controlling.

(5) There can be provided a lower half body module of a bipedal walking robot which is excellent in energy savings. Therefore, this is why the legs of the lower half body module are formed by the parallel link mechanism portions, and therefore, in comparison with a serial link mechanism, when the lower half body module assumes a low posture, load torques applied to the actuators of the links can be reduced and power of actuators can be suppressed.

(6) There can be provided a lower half body module of a bipedal walking robot which is excellent in cost savings and power savings in manufacturing and capable of improving maintainability, since a plurality of links, which constitute the parallel link mechanism portions, may have the same structure with each other.

(7) There can be provided a lower half body module of a bipedal walking robot capable of stably operating and establishing a wide movable range. Therefore, this is why ends of the linear motion link are respectively connected with the base and the foot by the base side passive joint having two degrees of freedom and the foot side passive joint having three degrees of freedom, and therefore each passive joint follows telescopic motions of the linear motion links without preventing it from being smoothly driven by the linear motion links.

(8) There can be provided a lower half body module of a bipedal walking robot capable of performing various operations and of smoothly performing walking operation, since each parallel link mechanism portion of the right and left legs is formed with six degrees of freedom and therefore the right foot and the left foot can operate back and forth, right and left, up and down and in the axis circumferential directions respectively making longitudinal, lateral and vertical directions axis.

In addition to the effect of Claim 1, by the invention according to Claim 2, (1) there can be provided a lower half body module of a bipedal walking robot which is excellent in stability and rigidity and capable of simplifying operation controlling, since each parallel link mechanism portion, which is employed in the right and left legs, is constituted by a Stuart platform, in which two linear motion links as a set are provided in a V-shape and the three sets are provided.

In addition to the effect of Claim 1 or Claim 2, by the invention according to Claim 3, (1) there can be provided a lower half body module of a bipedal walking robot capable of smoothly performing walking operation, since each parallel link mechanism portion has six degrees of freedom and therefore the right foot and left foot can perform various operations.

(2) There can be provided a lower half body module of a bipedal walking robot capable of walking stably. Therefore, this is why in a case that the parallel link mechanism portion of the right leg and the parallel link mechanism of the left leg are symmetrically provided, walking control can be performed since each parallel link mechanism portion has six degrees of freedom, so that a moment of an axis circumferential direction is not applied to a waist axis of the lower half body module during the walking operation, and therefore the base does not rotate in the axis circumferential direction of the waist axis during walking.

In addition the effect of Claim 3, by the invention according to Claim 4, (1) there can be provided a lower half body module of a bipedal walking robot which is excellent in the degree of freedom in designing in the point that it is possible to miniaturize and compact a device, because the linear motion links do not interfere with each other by employing the linear motion links, whose movable directions are longitudinal directions thereof, as links of the parallel link mechanism portions.

(2) There can be provided a lower half body module of a bipedal walking robot which is excellent in energy savings. Therefore, this is why a difference between a load applied to the actuator at expansion of the linear motion link and a load applied to the actuator at contraction of the linear motion link is kept small by employing the linear motion links, whose movable directions are the longitudinal direction thereof, as a link of the parallel link mechanism portions, and therefore when the lower half body module assumes a low posture, load torques applied to the actuators can be reduced and power of the actuators can be suppressed.

(3) There can be provided a lower half body module of a bipedal walking robot which is excellent in strength and rigidity and which is excellent in the degree of freedom in designing in the point that a selection range of materials or shapes is widened, since only expansion and contraction powers are applied to each linear motion link and a bending moment is not applied to each linear motion link.

In addition to the effect of any one of Claims 1 to 4, by the invention according to Claim 5, (1) there can be provided a lower half body module of a bipedal walking robot capable of reducing the number of parts and capable of easily performing high precision displacement control, since a linear motion type actuator can be employed to telescope the linear motion link in a longitudinal direction thereof.

In addition to the effect of Claim 5, by the invention according to Claim 6, (1) there can be provided a lower half body module of a bipedal walking robot which is excellent in energy savings and stability. Therefore, this is why the linear motion actuators are provided at the base side, and therefore both weights of the linear motion links on the right foot side and the left foot side can be reduced, and power causing the right and left feet to operate can be reduced.

What is claimed is:

1. A lower half body module of a bipedal walking robot comprising:
   a base;
   a right foot and a left foot;
   a plurality of passive joints which are respectively provided on said base, said right foot and said left foot; and
   parallel link mechanism portions which are respectively provided between said passive joint provided on said base and said passive joints provided on said right foot and between said passive joint provided on said base and said passive joints provided on said left foot, and further comprising as said passive joints:
   base side passive joints having overturned U-shaped base side upper couplings fixed to said base, overturned U-shaped base side lower couplings fixed to ends of said linear motion links respectively and connecting rotating portions which orthogonally and rotatably connect said base side upper coupling with said base side lower coupling;
   foot side passive joints having overturned U-shaped foot side upper couplings fixed to the other ends of said linear motion links respectively, overturned U-shaped foot side lower couplings rotatably fixed to said feet respectively, and connecting rotating portions which respectively orthogonally and rotatably connect said foot side upper coupling with said foot side lower coupling; and
   the parallel link mechanism portion (1a) of the right leg and the parallel link mechanism portion (1b) of the left leg provided on the both sides of the base (2) respectively so as to be symmetrically to the center thereof.

2. A lower half body module of a bipedal walking robot according to claim 1, wherein the three sets of said parallel link mechanism portions are respectively provided between said base and said right foot and between said base and said left foot.

3. A lower half body module of a bipedal walking robot according to any one of claims 1 or 2, wherein said parallel link mechanism portions respectively have six degrees of freedom.

4. A lower half body module of a bipedal walking robot according to any one of claims 1 or 2, comprising a plurality of telescopic linear motion links which are provided between said base and said right foot and between said base and said left foot via said passive joints as links of said parallel link mechanism portions.

5. A lower half body module of a bipedal walking robot according to claim 4, wherein the links of said parallel link mechanism portions respectively include a linear motion type actuator as an actuator.

6. A lower half body module of a bipedal walking robot according to claim 5, wherein said linear motion type actuator is provided at said base side of said linear motion link.

* * * * *